(12) United States Patent
Mocanu et al.

(10) Patent No.: US 12,384,272 B2
(45) Date of Patent: Aug. 12, 2025

(54) AIR BAG SENSOR FOR VEHICLE PROTECTION DURING PARKING MODE

(71) Applicant: Infineon Technologies AG, Neubiberg (DE)

(72) Inventors: Dan-Alexandru Mocanu, Bucharest (RO); Ilie-Ionut Cristea, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 299 days.

(21) Appl. No.: 18/067,258

(22) Filed: Dec. 16, 2022

(65) Prior Publication Data

US 2024/0198847 A1    Jun. 20, 2024

(51) Int. Cl.
*B60L 58/00* (2019.01)
*B60L 3/04* (2006.01)
*B60L 58/10* (2019.01)
*B60R 21/013* (2006.01)

(52) U.S. Cl.
CPC ............... *B60L 58/10* (2019.02); *B60L 3/04* (2013.01); *B60R 21/013* (2013.01)

(58) Field of Classification Search
CPC ........... B60L 58/10; B60L 3/04; B60R 21/013
USPC ......................................................... 701/22
See application file for complete search history.

(56) References Cited

U.S. PATENT DOCUMENTS

| | | |
|---|---|---|
| 2013/0154352 A1 | 6/2013 | Tokarz et al. |
| 2018/0111482 A1 | 4/2018 | Saito et al. |

FOREIGN PATENT DOCUMENTS

| | | | | |
|---|---|---|---|---|
| CN | 107097744 A | | 8/2017 | |
| CN | 110103716 A | | 8/2019 | |
| CN | 112208470 A | * | 1/2021 | ......... B60R 16/0231 |
| CN | 112977338 B | * | 3/2023 | .......... B60R 25/102 |
| EP | 3820009 A1 | | 5/2021 | |

OTHER PUBLICATIONS

"Parking Mode Explained," VanTrue, Dec. 2, 2022, whole document. (Year: 2022).*
Art Pini, "How to Apply PSI5 for Reliable Sensor Intensive Automotive Safety," DigiKey, whole document. (Year: 2018).*
CN112208470 English Translation. (Year: 2021).*
CN112977338 English Translation (Year: 2023).*

* cited by examiner

*Primary Examiner* — Tiffany P Young
(74) *Attorney, Agent, or Firm* — Harrity & Harrity, LLP

(57) ABSTRACT

A vehicle system includes a vehicle controller configured to detect a parking mode of a vehicle and generate a low-power command based on detecting the parking mode; a collision monitoring system; and a communication interface. The collision monitoring system includes a sensor controller configured to receive the low-power command via the communication interface, enter into a low-power mode, and set the communication interface into an idle communication mode during the low-power mode; a sensor configured to generate a sensor signal based on a measured property; and a processing circuit configured to compute, during the low-power mode, a derivative measurement at a plurality of sampling times based on the sensor signal, and compare each instance of the derivative measurement to a threshold. The sensor controller is configured to transmit a wake-up command to the vehicle controller via the communication interface based on the derivative measurement satisfying the threshold.

24 Claims, 4 Drawing Sheets

AIR BAG SENSOR FOR VEHICLE
PROTECTION DURING PARKING MODE

BACKGROUND

An airbag system implemented in a vehicle is typically used to detect collisions during operation of the vehicle and deploy one or more air bags based on detecting a collision. While the vehicle is being driven, the airbag system of the vehicle may gather information regarding a current state of the vehicle and can signal other systems to take one or more actions in the event the current state of the vehicle indicates that a collision or another extreme situation that causes an abrupt change in the current state of the vehicle has occurred.

SUMMARY

In some implementations, a vehicle system includes a vehicle controller configured to detect a parking mode of a vehicle and generate a low-power command based on detecting the parking mode; a collision monitoring system; and a current-modulation communication interface coupled to the vehicle controller and the collision monitoring system, wherein the collision monitoring system comprises: a sensor controller configured to receive the low-power command via the current-modulation communication interface and enter into a low-power mode based on receiving the low-power command, wherein the sensor controller is configured to set the current-modulation communication interface into an idle communication mode during the low-power mode; a sensor configured to generate a sensor signal based on a measured property; a processing circuit configured to compute, during the low-power mode, a derivative measurement at a plurality of sampling times based on the sensor signal, and compare each instance of the derivative measurement to a threshold, wherein the sensor controller is configured to transmit a wake-up command to the vehicle controller via the current-modulation communication interface based on the derivative measurement satisfying the threshold.

In some implementations, an air bag system of a vehicle includes a collision monitoring system coupled to a current-modulation communication interface, wherein the collision monitoring system comprises: a sensor controller configured to receive a parking mode command via the current-modulation communication interface and enter into a low-power mode based on receiving the parking mode command, wherein the parking mode command is indicative of the vehicle being in a parked state, and wherein the sensor controller is configured to set the current-modulation communication interface into an idle communication mode during the low-power mode; an air bag sensor configured to generate a sensor signal during the low-power mode based on a measured property; and a processing circuit configured to compute, during the low-power mode, a derivative measurement at a plurality of sampling times based on the sensor signal, and compare each instance of the derivative measurement to a threshold, wherein the sensor controller is configured to exit the low-power mode and transmit an alarm signal via the current-modulation communication interface based on the derivative measurement satisfying the threshold at one of the plurality of sampling times.

In some implementations, a method includes detecting, by a vehicle controller, a parking mode of a vehicle; generating, by the vehicle controller, a low-power command based on detecting the parking mode; receiving, by a sensor controller, the low-power command via a current-modulation communication interface; and entering, by the sensor controller, into a low-power mode based on receiving the low-power command, including setting the current-modulation communication interface into an idle communication mode during the low-power mode; wherein, during the low-power mode, the method further comprises: generating, by a sensor, a sensor signal based on a measured property; computing, by a processing circuit, a derivative measurement at a plurality of sampling times based on the sensor signal; comparing, by the processing circuit, each instance of the derivative measurement to a threshold; and transmitting, by the sensor controller, a wake-up command to the vehicle controller via the current-modulation communication interface based on the derivative measurement satisfying the threshold.

BRIEF DESCRIPTION OF THE DRAWINGS

Implementations are described herein with reference to the appended drawings.

DETAILED DESCRIPTION

Figure 1:
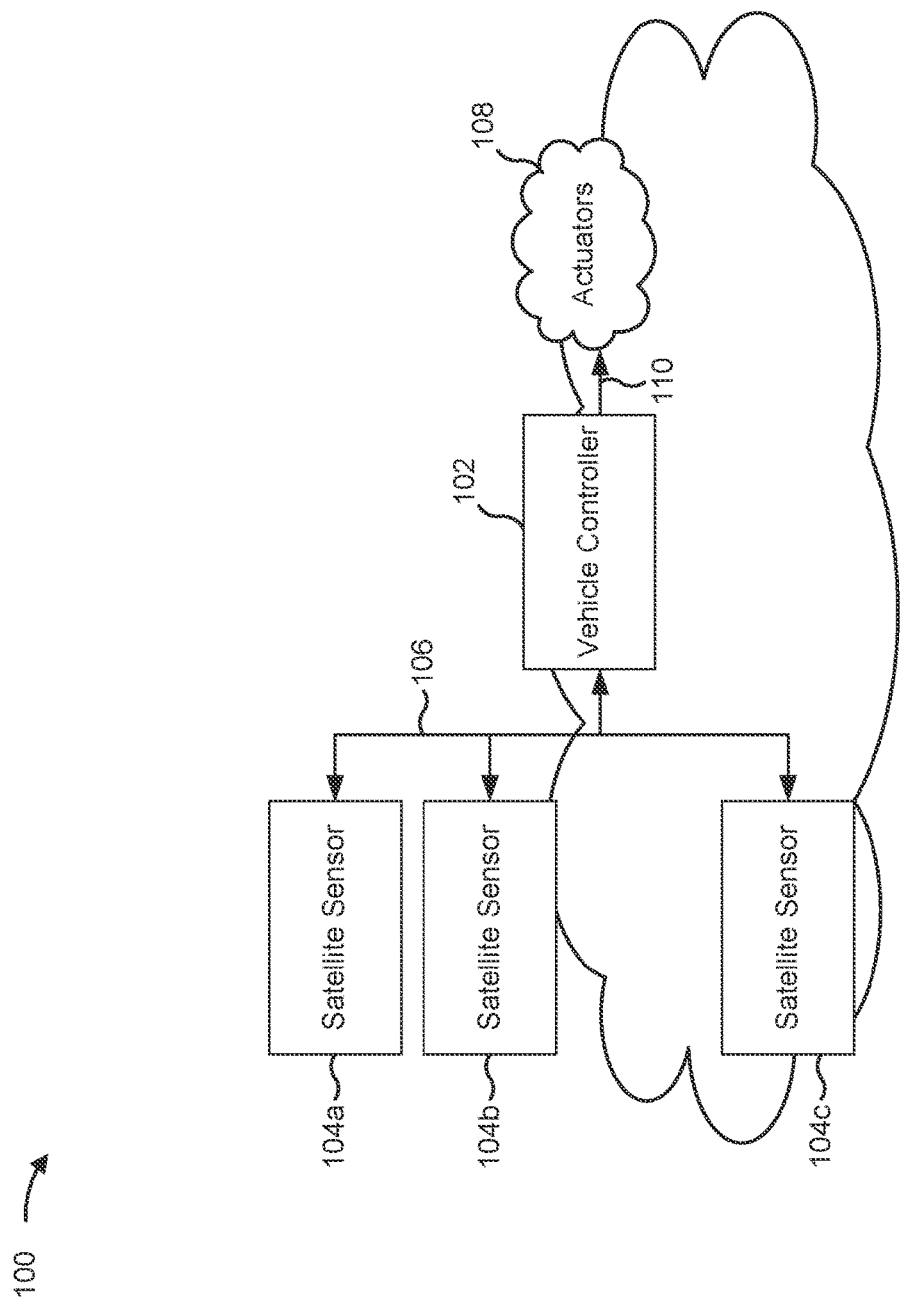
FIG. 1 is a diagram of an example vehicle system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electric signal (e.g., a current signal or a voltage signal). The property to be measured may, for example, comprise a magnetic field, an electric field, an electromagnetic wave (e.g., a radio wave), a pressure, a force, a current, or a voltage, but is not limited thereto. For instance, it will be appreciated that there are various sensor techniques for measuring a collision event or another type of extreme event of a vehicle. For example, an airbag system may include a pressure sensor and/or an acceleration sensor for detecting a collision event or another type of extreme event. If the collision event or another type of extreme event is detected, the airbag system may trigger one or more safety protocols, such as deployment of one or more airbags. Thus, while the vehicle is being driven, the airbag system may gather information regarding a current state of the vehicle and can signal other systems to take one or more actions in the event a current state of the vehicle indicates that a collision or another extreme situation has occurred. While the vehicle is parked, the airbag system is typically turned off in order to reduce an overall current consumption in the vehicle (e.g., to save power and prevent a vehicle battery from being drained). As a result, while the vehicle is parked, the airbag system typically does not monitor for collision events or provide information to other systems information to alert the systems about a collision event that may occur while the vehicle is parked.

Accordingly, some implementations disclosed herein are directed to a collision monitoring system that monitors for a collision or another extreme situation while a vehicle is parked with reduced current consumption. For example, the collision monitoring system may be operated in a low-power mode (LPM) while the vehicle is in a parked state (e.g., a parking mode). For example, the collision monitoring system may include a sensor controller configured to receive a low-power command from a vehicle controller via a current-modulation communication interface and enter into a low-power mode based on receiving the low-power command. The sensor controller may be configured to set the current-modulation communication interface into an idle communication mode during the low-power mode in order to reduce the current consumption of the collision monitoring system during the parked state. The collision monitoring system may further include a sensor configured to generate a sensor signal based on a measured property, such as pressure or acceleration. The collision monitoring system may further include a processing circuit configured to compute, during the low-power mode, a derivative measurement at a plurality of sampling times based on the sensor signal, and compare each instance of the derivative measurement to a threshold. In addition, the sensor controller may be configured to transmit a wake-up command to the vehicle controller via the current-modulation communication interface based on the derivative measurement satisfying the threshold.

In some implementations, the parking mode includes turning off an engine of the vehicle. Thus, parking mode may be detected based a transmission of the vehicle being set into a parked state and based on the engine being turned off.

In some implementations, the collision monitoring system is an airbag system of the vehicle.

In some implementations, the collision monitoring system may trigger a safety protocol, such as disconnecting an electric battery of an electric vehicle from a motor of the vehicle to prevent a hazardous situation, based on detecting a collision event (e.g., a crash). The collision event may be detected based on the derivative measurement satisfying the threshold (e.g., based on the derivative measurement being equal to or greater than the threshold or based on the derivative measurement being greater than the threshold).

Accordingly, the collision monitoring system may enable monitoring of collision events while the vehicle is parked and/or while an engine of the vehicle is turned off, while reducing a power consumption of the vehicle's battery.

FIG. 1 is a diagram of an example vehicle system 100 according to one or more implementations. As shown in FIG. 1, the vehicle system 100 may include a vehicle controller 102, one or more satellite sensors 104, a first communication interface 106, one or more actuators 108, and a second communication interface 110.

The vehicle controller 102 may be configured to control one or more functions within the vehicle system 100. The vehicle controller 102 may control one or more functions based on sensor information received from the one or more satellite sensors 104. For example, the vehicle controller 102 may control the one or more actuators 108 via the second communication interface 110 based on the sensor information received from the one or more satellite sensors 104. One or more functions may include deploying one or more airbags and/or disconnecting a vehicle battery from a motor of the vehicle based on a collision event being detected. In some implementations, the vehicle controller 102 may be an electronic control unit (ECU).

The one or more satellite sensors 104 may include a plurality of satellite sensors, including a first satellite sensor 104a, a second satellite sensor 104b, and a third satellite sensor 104c. The satellite sensors 104 may include pressure sensors, acceleration sensors, speed sensors, radar sensors, and other vehicle sensors. One or more of the satellite sensors 104 may be part of an airbag system of the vehicle that may be configured to monitor for and detect collision events.

The first communication interface 106 may be coupled to one or more of the satellite sensors 104 and the vehicle controller 102 to enable communication between the vehicle controller and the satellite sensors 104. For example, the vehicle controller 102 may be configured to transmit commands or configuration information to the satellite sensors 104 via the first communication interface 106. In some implementations, the vehicle controller 102 may be configured to transmit low-power commands to the satellite sensors 104 via the first communication interface 106 in order to instruct the satellite sensors 104 to enter a low-power mode, a parking mode, or some other mode that alters or otherwise reconfigures an operation state of the satellite sensors 104. For example, the satellite sensors 104 may be configured in a normal operation mode or a driving mode while the vehicle is being driven and/or while an engine of the vehicle is turned on. The satellite sensors 104 may be configured in the low-power mode or the parking mode while the vehicle is parked and/or while the engine of the vehicle is turned off.

The satellite sensors 104 may be configured to transmit sensor information, status information, or alarm signals to the vehicle controller 102 via the first communication interface 106.

In some implementations, the first communication interface 106 may be current-modulation communication interface, such as a peripheral sensor interface 5 (PSI5). The PSI5 interface is a bus interface on which a current-modulated digital Manchester code is transmitted over a twisted pair cable. Different binary codes may be transmitted for different communication signals (e.g., different commands, alarm signals, configuration signals, and data signals). In other words, the PSI5 interface is a two-wire peripheral sensor interface and a current carried on the PSI5 interface may be modulated based on a communication protocol in order to transmit information. Because the PSI5 interface is a current-modulated interface, the PSI5 interface may be resistant to electromagnetic interference that may be more prevalent in vehicle systems.

The first communication interface 106 may be configured into an idle communication mode or a transmission communication mode (e.g., an active communication mode). During the idle communication mode, a current on the current-modulation communication interface may be set or fixed to a low current level (e.g., an idle current level) during which communications on the current-modulation communication interface are disabled. During the transmission communication mode, the current on the current-modulation communication interface may be toggled between two or more current levels. For example, the current on the current-modulation communication interface may be toggled between two or more current levels to generate current pulses. In some implementations, the two or more current levels include the low current level and a high current level that is higher than the low current level. The low current level may be set during the low-power mode or the parking mode in order to reduce the current consumption drawn from the vehicle battery.

The number and arrangement of components shown in FIG. 1 are provided as an example. In practice, the vehicle system 100 may include additional components, fewer components, different components, or differently arranged components than those shown in FIG. 1.

Figures 2, 3:
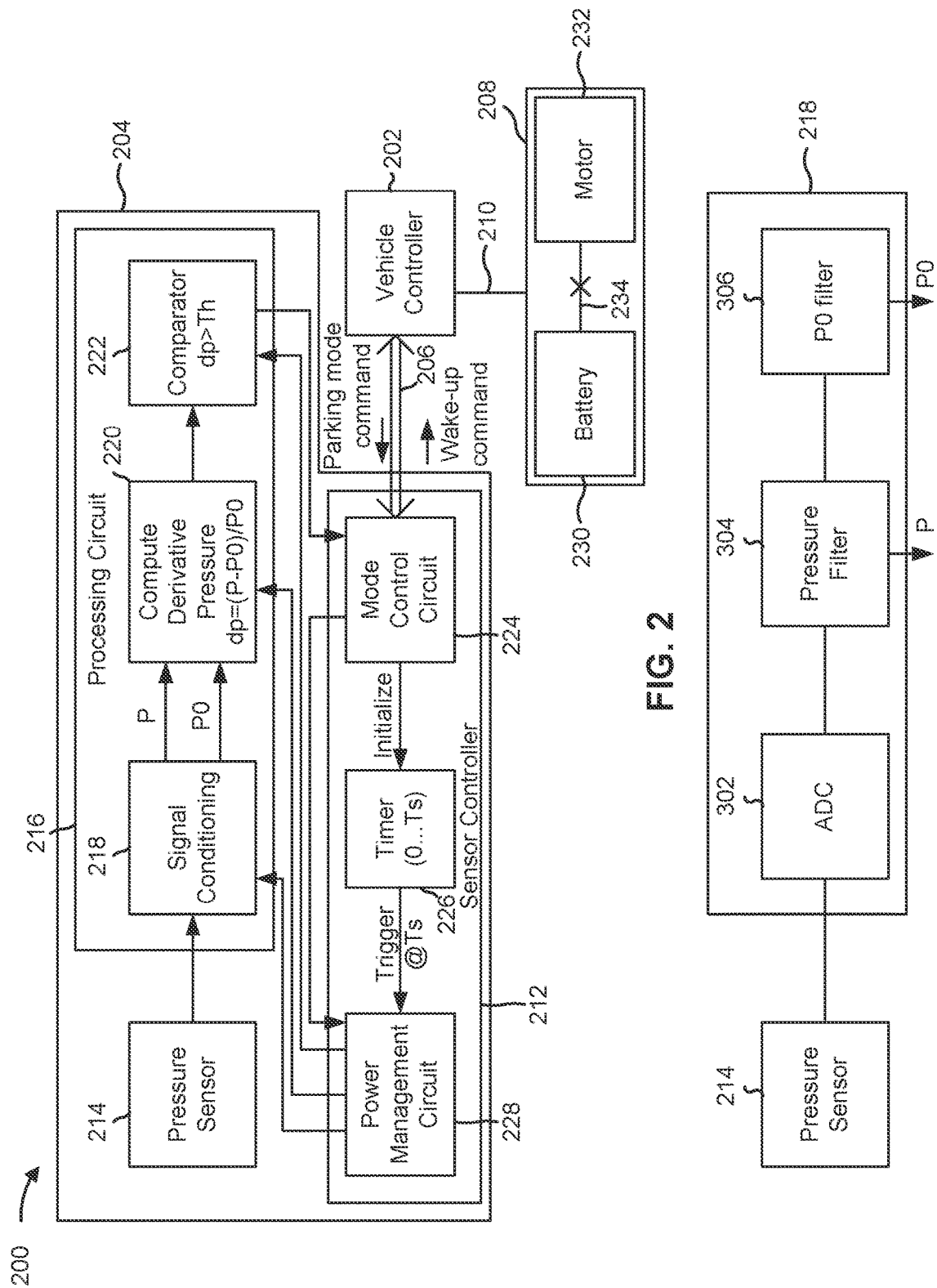
FIG. 2 is a diagram of an example vehicle system according to one or more implementations.
FIG. 3 is a diagram of an example signal conditioning circuit according to one or more implementations.

FIG. 2 is a diagram of an example vehicle system 200 according to one or more implementations. As shown in FIG. 1, the vehicle system 200 may include a vehicle controller 202 (e.g., vehicle controller 102), a collision monitoring system 204 (e.g., including one or more satellite sensors 104), a current-modulation communication interface 206 (e.g., first communication interface 106), an actuator system 208, and a communication interface 210 (e.g., second communication interface 110).

The vehicle controller 202 may be configured to transmit a parking mode command or a low-power mode command to the collision monitoring system 204 via the current-modulation communication interface 206. Additionally, the vehicle controller 202 may be configured to receive a wake-up command from the collision monitoring system 204 via the current-modulation communication interface 206. Additionally, or alternatively, the vehicle controller 202 may be configured to receive an alarm signal from the collision monitoring system 204 via the current-modulation communication interface 206. Additionally, or alternatively, the vehicle controller 202 may be configured to receive sensor information from the collision monitoring system 204 via the current-modulation communication interface 206.

In particular, the vehicle controller 202 may be configured to detect a parking mode of a vehicle and generate the parking mode command or the low-power mode command based on detecting the parking mode. The vehicle controller 202 may detect the parking mode of the vehicle based on a transmission of the vehicle being placed in park and/or the engine being turned off. Additionally, the vehicle controller 202 may place itself and other vehicle components into a low-power mode until the vehicle exits the parking mode (e.g., the vehicle enters a driving mode) or until the vehicle controller 202 receives the wake-up command from the collision monitoring system 204. The low-power mode may be a sleep mode, an idle mode, or another low-power state during which core processing functions of the vehicle controller 202 are disabled. For example, during the low-power mode, the vehicle controller 202 may continue to monitor a state of the vehicle (e.g., for a transition from the parking mode to the driving mode) and monitor for a wake-up command received on the current-modulation communication interface 206.

The collision monitoring system 204 may include a sensor controller 212, a sensor 214, and a processing circuit 216. In some implementations, the collision monitoring system 204 may be an air bag system or part of the air bag system, and the sensor 214 may be an air bag sensor configured to sense abrupt or rapid changes in a measured property indicative of a collision event. For example, the sensor 214 may be a pressure sensor configured to measure a pressure and sense abrupt or rapid changes in the pressure indicative of the collision event. Alternatively, the sensor 214 may be an acceleration sensor configured to measure sense abrupt or rapid changes in acceleration and deceleration indicative of the collision event. The sensor is configured to generate a sensor signal based on the measured property and transmit the sensor signal to the processing circuit 216.

The processing circuit 216 may include a signal conditioning circuit 218, a computing unit 220, and a comparator circuit 222. The signal conditioning circuit 218 may be configured to generate an instantaneous measurement P of the measured property based on the sensor signal and generate an ambient measurement P0 of the measured property based on the sensor signal. The ambient measurement P0 may be representative of an ambient pressure of an airbag sensor or a measurement of property that serves as a baseline.

For example, FIG. 3 is a diagram of an example of the signal conditioning circuit 218 according to one or more implementations. In view of FIG. 3, the signal conditioning circuit 218 may include an analog-to-digital converter (ADC) 302, a first filter 304 (e.g., a pressure filter), and a second filter 306 (e.g., an ambient pressure filter). The ADC 302 may be configured to convert the sensor signal from an analog signal into a digital signal. For example, the ADC 302 may be configured to acquire or otherwise generate a plurality of digital samples based on the sensor signal and provide the digital signal, including the plurality of digital samples, to the first filter 304. The first filter 304 may be configured with a first filter characteristic. The first filter 304 may be configured to filter the digital signal based on the first filter characteristic to generate the instantaneous measurement P. The second filter 306 may be configured with a second filter characteristic that is different from the first filter characteristic. The second filter 306 may be configured to filter the digital signal or the output of the first filter 304 (e.g., the instantaneous measurement P) based on the second filter characteristic to generate the ambient measurement P0.

The number and arrangement of components shown in FIG. 3 are provided as an example. In practice, the signal conditioning circuit 218 may include additional components, fewer components, different components, or differently arranged components than those shown in FIG. 3.

Turning back to FIG. 2, the signal conditioning circuit 218 may be configured to provide the instantaneous measurement P and the ambient measurement P0 to the computing unit 220. The computing unit 220 may be a processor, a state machine, or a logic circuit configured to compute a derivative measurement dp of the sensed property based on the instantaneous measurement P and the ambient measurement P0. For example, the derivative measurement dp may be calculated based on the following equation:

$$dp = (P - P0)/P0$$

The computing unit 220 may be configured to calculate the derivative measurement dp at a plurality of sampling times. For example, each sampling time may be triggered by the sensor controller 212, and the derivative measurement dp may be generated for each sampling time of the plurality of sampling times.

The computing unit 220 may provide the derivative measurement dp to the comparator circuit 222, and the comparator circuit 222 may be configured to compare each instance of the derivative measurement dp to a threshold Th. The comparator circuit 222 may provide a comparison result for each instance of the derivative measurement dp to the sensor controller 212. For example, the comparison result may indicate whether or not the derivative measurement dp satisfies the threshold Th. The derivative measurement dp may satisfy the threshold Th, which may be indicative of the collision event, when the derivative measurement dp is equal to or greater than the threshold Th or when the derivative measurement dp is greater than the threshold Th.

The sensor controller 212 may include a mode control circuit 224, a timer 226 (e.g., a counter), and a power management circuit 228. The mode control circuit 224 may be configured to control an operation mode of the collision monitoring system 204. For example, the collision monitoring system 204 may be configured to be operated in a normal operation mode (e.g., a driving mode) or a low-power mode (e.g., a parking mode). The mode control circuit 224 may be configured to receive the low-power command or the parking mode comment via the current-modulation communication interface 206 and enter into a low-power mode based on receiving the low-power command or the parking mode command. The low-power command or the parking mode command may be indicative of the vehicle being in a parked state. For example, as described above, the vehicle controller 202 may be configured to detect the parking mode of the vehicle and generate the low-power command or the parking mode command based on detecting the parking mode.

The mode control circuit 224 may be configured to set the current-modulation communication interface 206 into an idle communication mode during the low-power mode. In other words, in some implementations, the mode control circuit 224 may be configured to set the current-modulation communication interface 206 into the idle communication mode in response receiving the low-power command or the parking mode command. For example, the mode control circuit 224 may set a current of the current-modulation communication interface 206 to the low current level based on receiving the low-power command or the parking mode command. The low current level may be less than a transmission current level used to transmit information on the current-modulation communication interface 206. Accordingly, the current consumption drawn from the vehicle battery may be reduced during the low-power mode.

In addition, the mode control circuit 224 may be configured to release the current-modulation communication interface 206 from the idle communication mode based on the derivative measurement dp satisfying the threshold Th. That is, the mode control circuit 224 may exit the low-power mode and may initiate a communication on the current-modulation communication interface 206, if the comparison result generated by the comparator circuit 222 indicates that the derivative measurement dp satisfies the threshold Th. In some implementations, the mode control circuit 224 may transmit a wake-up command to the vehicle controller 202 via the current-modulation communication interface 206 based on the derivative measurement dp satisfying the threshold Th. The mode control circuit 224 may be configured transmit the wake-up command by toggling a current on the current-modulation communication interface 206 based on the communication protocol.

The vehicle controller 202 may be configured to exit its low-power mode based on receiving the wake-up command. In some implementations, the wake-up command is an alarm signal that may indicate that a collision event has occurred. The vehicle controller 202 may be configured to perform additional functions once the vehicle controller 202 has exited its low power mode, responsive to receiving the wake-up command. For example, in some implementations, the vehicle controller 202 may transmit a control signal to the actuator system 208 via the communication interface 210. The actuator system 208 may include a battery 230 (e.g., the vehicle battery) and a motor 232 coupled by an electrical connection 234. The vehicle controller 202 may disconnect or otherwise interrupt the electrical connection 234 between the battery 230 and the motor 232 based on receiving the wake-up command from the collision monitoring system 204.

The mode control circuit 224 may be further configured to initialize the timer 226 based on receiving the low-power command or the parking mode command from the vehicle controller 202 (e.g., in response to entering the low-power mode). The timer 226 may be configured to count up from zero to a timer threshold Ts, and then repeat the count upon reaching the timer threshold Ts. The timer threshold Ts may be representative of a sampling time at which a measurement or a sample of the derivative measurement dp is generated. In other words, the timer 226 may trigger the measurement of the derivative measurement dp and a comparison of the derivative measurement dp with the threshold Th at each instance the timer 226 counts to the timer threshold Ts during the low-power mode. Therefore, the processing circuit 216 may be configured to compute, during the low-power mode, the derivative measurement dp at a plurality of sampling times, with each sampling time being triggered by the timer threshold Ts being satisfied at the timer 226. The processing circuit 216 may be configured to compare each instance of the derivative measurement dp to the threshold Th to generate the comparison result that is provided to the mode control circuit 224.

In some implementations, the timer 226 may be configured to generate a trigger signal for each instance the timer 226 counts to the timer threshold Ts during the low-power mode and provide the trigger signal to the power management circuit 228. Thus, the timer 226 may be configured to trigger, during the low-power mode, each sampling time of the plurality of sampling times at a regular interval. The processing circuit 216 may be configured to compute each instance of the derivative measurement dp at a different sampling time of the plurality of sampling times and compare each instance of the derivative measurement dp to the threshold Th.

The power management circuit 228 may be configured to control a power state of the processing circuit 216. In particular, the power management circuit 228 may be configured to control a power state of the signal conditioning circuit 218, the computing unit 220, and the comparator circuit 222. For example, the power management circuit 228 may be configured to power down at least one component of the processing circuit 216, including the signal conditioning circuit 218, the computing unit 220, and/or the comparator circuit 222, between sampling times (e.g., between trigger signals) and power up the at least one component of the processing circuit 216 at each sampling time (e.g., at each trigger signal) to compute the derivative measurement dp and compare the derivative measurement dp with the threshold Th. In other words, the processing circuit 216 is powered on for a short period of time (e.g., a short interval) that is sufficient to compute the derivative measurement dp and compare the derivative measurement dp with the threshold Th before being powered down again between sampling times. As a result, processing power consumed by the processing circuit 216 can be reduced between sampling times and can be reduced overall during the low-power mode. Accordingly, power consumed from the battery 230 can be reduced while the collision monitoring system 204 monitors for the collision event and while the vehicle is in parked state.

As indicated above, FIGS. 2 and 3 are provided merely as an example. Other examples are possible and may differ from what was described with regard to FIGS. 2 and 3. The number and arrangement of components shown in FIGS. 2 and 3 are provided as an example. In practice, the vehicle system 200 may include additional components, fewer components, different components, or differently arranged components than those shown in FIGS. 2 and 3. Two or more components shown in FIGS. 2 and 3 may be implemented within a single component, or a single component shown in FIGS. 2 and 3 may be implemented as multiple, distributed components. Additionally, or alternatively, a set of components (e.g., one or more components) of the vehicle system 200 may perform one or more functions described as being performed by another set of components of the vehicle system 200.

Figure 4:
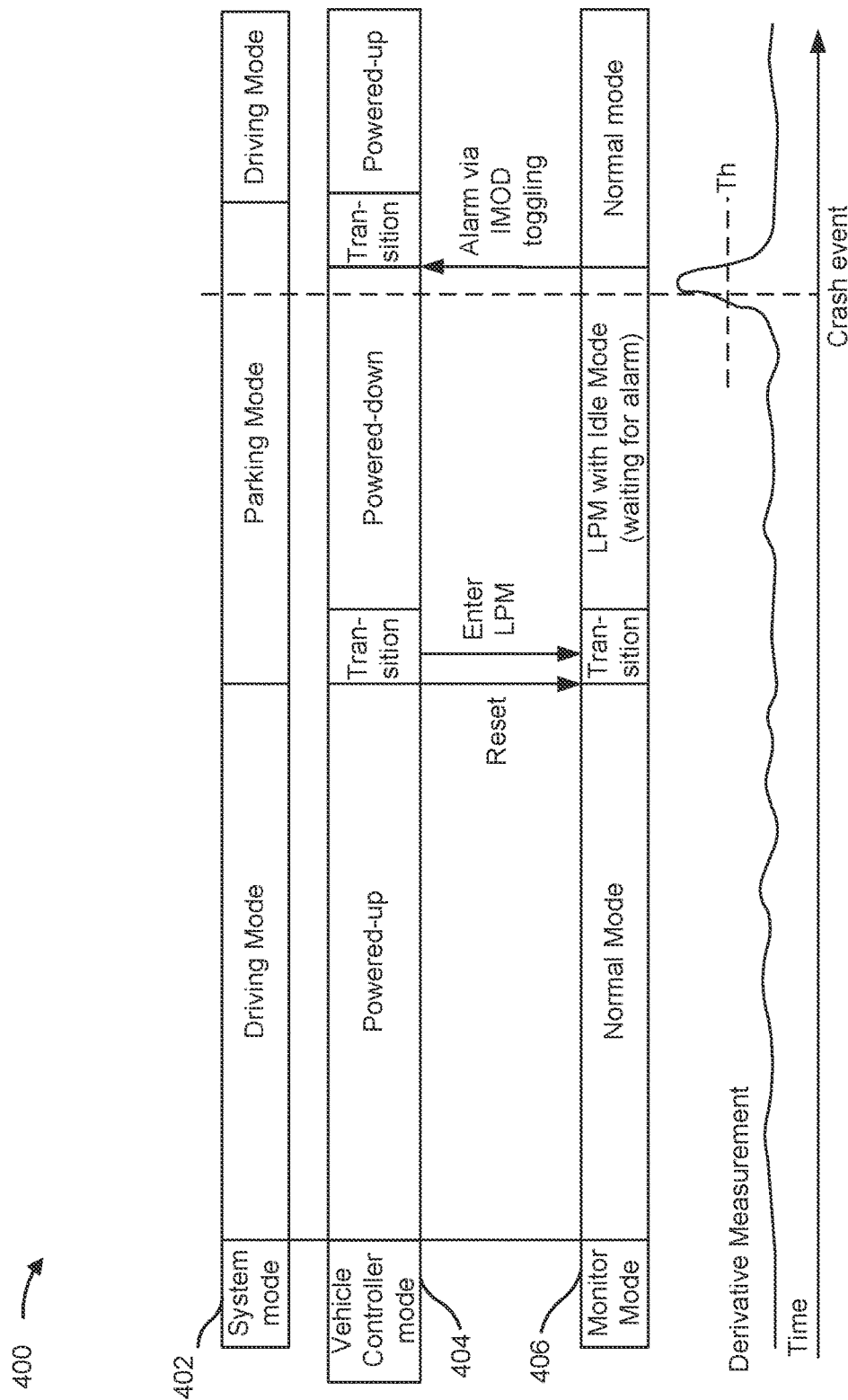
FIG. 4 is a timing diagram according to one or more implementations.

FIG. 4 is a timing diagram 400 according to one or more implementations. The timing diagram 400 shows a progression of different operation modes over time, including operation modes 402 for the vehicle system 200, operation modes 404 for the vehicle controller 202, and operation modes 406 for the collision monitoring system 204.

The operation modes 402 for the vehicle system 200 may include a driving mode and a parking mode. The operation modes 404 for the vehicle controller 202 may include a powered-up mode and a powered-down mode (e.g., an LPM). The operation modes 406 for the collision monitoring system 204 may include a normal mode and an LPM.

While the vehicle system 200 is in the driving mode, the vehicle controller 202 may be in the powered-up mode and the collision monitoring system 204 may be in the normal mode. Additionally, the current-modulation communication interface 206 may be in a communication mode (e.g., non-idle mode).

Based on the vehicle system 200 entering the parking mode, the vehicle controller 202 may detect the parking mode and transition into the power-down mode. During a transition from the powered-up mode to the power-down mode, the vehicle controller 202 may reset the collision monitoring system 204 and transmit the low-power mode command to the collision monitoring system 204.

The collision monitoring system 204 may be configured to transition into a low-power mode based on receiving the low-power mode command from the vehicle controller 202. The collision monitoring system 204 may also set the current-modulation communication interface 206 into the idle communication mode during the low-power mode.

During the low-power mode, the collision monitoring system 204 may monitor for a collision event (e.g., a crash even) as similarly described herein. For example, the collision monitoring system 204 may detect the collision event by monitoring the derivative measurement dp in comparison with the threshold Th.

Based on detecting the collision event, the collision monitoring system 204 may be configured to exit the low-power mode and enter into the normal mode. The collision monitoring system 204 may also release the current-modulation communication interface 206 from the idle communication mode and transmit an alarm via current modulation toggling (e.g., IMOD toggling) on the current-modulation communication interface 206.

Based on receiving the alarm, the vehicle controller 202 may be configured to wake up and transition from the powered-down mode to the powered-up mode in order to perform one or more functions. Additionally, the vehicle system 200 may exit parking mode and enter driving mode.

The number and ordering of modes shown in FIG. 4 are provided as an example. In practice, the timing diagram 400 may include additional modes, fewer modes, different modes, or differently arranged modes than those shown in FIG. 4.

Figure 5:
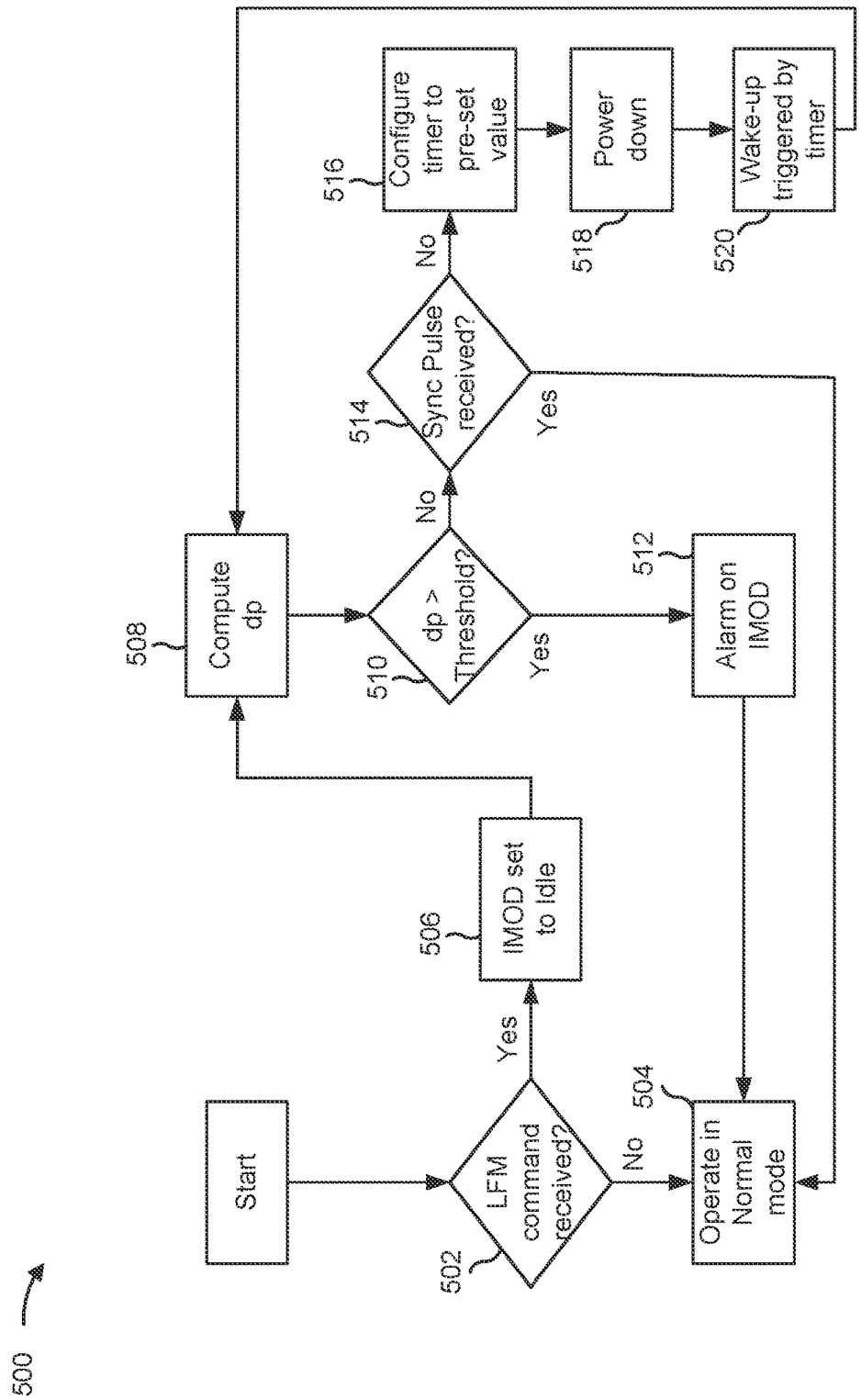
FIG. 5 is a flow diagram of an example process performed by a collision monitoring system according to one or more implementations.

FIG. 5 is a flow diagram of an example process 500 performed by a collision monitoring system according to one or more implementations. In some implementations, one or more process blocks of FIG. 5 are performed by the collision monitoring system 204. For example, one or more process blocks of FIG. 5 may be performed by one or more components of the collision monitoring system 204, such as the sensor controller 212, the sensor 214, and/or the processing circuit 216.

As shown in FIG. 5, process 500 may include monitoring for a low-power mode command (block 502). For example, the mode control circuit 224 may monitoring for the low-power mode command.

As further shown in FIG. 5, process 500 may include operating in normal mode if the low-power mode command is not received (block 504) or operating in low-power mode if the low-power mode command is received (block 506), including setting the current-modulation communication interface 206 to the idle communication mode (e.g., IMOD set to idle). For example, the mode control circuit 224 may control the operation mode of the collision monitoring system 204 based on receiving the low-power mode command.

As further shown in FIG. 5, process 500 may include computing the derivative measurement dp (block 508) and comparing the derivative measurement dp to the threshold Th (block 510). For example, the processing circuit 216 may compute the derivative measurement dp (block 508) and compare the derivative measurement dp to the threshold Th.

As further shown in FIG. 5, process 500 may include transmitting the alarm signal via the current-modulation communication interface 206 by IMOD toggling (block 512) and changing the operation mode of the collision monitoring system 204 to the normal mode (block 504), based on the derivative measurement dp satisfying the threshold.

As further shown in FIG. 5, process 500 may include checking if a sync pulse has been received from the vehicle controller 202 via the current-modulation communication interface 206 (block 514), based on the derivative measurement dp not satisfying the threshold. For example, the vehicle controller 202 may transmit the sync pulse to the collision monitoring system 204 when the vehicle exits parking mode in order to instruct the collision monitoring system 204 to enter normal mode (e.g., for driving mode).

As further shown in FIG. 5, process 500 may include configuring the timer 226 to a preset value (e.g., the timer threshold Ts) (block 516), based on the derivative measurement dp not satisfying the threshold and based on the sync pulse not being received.

As further shown in FIG. 5, process 500 may include powering down the processing circuit 216 between sampling times (block 518) and waking up the processing circuit 216, triggered by the timer 226, at each sampling time (block 520) to compute the derivative measurement dp (block 508).

Process 500 may include additional implementations, such as any single implementation or any combination of implementations described below and/or in connection with one or more other processes described elsewhere herein.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A vehicle system, comprising: a vehicle controller configured to detect a parking mode of a vehicle and generate a low-power command based on detecting the parking mode; a collision monitoring system; and a current-modulation communication interface coupled to the vehicle controller and the collision monitoring system, wherein the collision monitoring system comprises: a sensor controller configured to receive the low-power command via the current-modulation communication interface and enter into a low-power mode based on receiving the low-power command, wherein the sensor controller is configured to set the current-modulation communication interface into an idle communication mode during the low-power mode; a sensor configured to generate a sensor signal based on a measured property; a processing circuit configured to compute, during the low-power mode, a derivative measurement at a plurality of sampling times based on the sensor signal, and compare each instance of the derivative measurement to a threshold, wherein the sensor controller is configured to transmit a wake-up command to the vehicle controller via the current-modulation communication interface based on the derivative measurement satisfying the threshold.

Aspect 2: The vehicle system of Aspect 1, wherein the sensor controller is configured to release the current-modulation communication interface from the idle communication mode based on the derivative measurement satisfying the threshold.

Aspect 3: The vehicle system of any of Aspects 1-2, wherein, in the low-power mode, the sensor controller is configured to set a current of the current-modulation communication interface to a low current based on receiving the low-power command, wherein the low current is less than a transmission current.

Aspect 4: The vehicle system of any of Aspects 1-3, wherein the current-modulation communication interface is a two-wire peripheral sensor interface.

Aspect 5: The vehicle system of any of Aspects 1-4, wherein the sensor is a pressure sensor or an acceleration sensor.

Aspect 6: The vehicle system of any of Aspects 1-5, wherein the low-power mode is a first low-power mode, wherein, the vehicle controller is configured to enter into a second low-power mode based on detecting the parking mode, and wherein the vehicle controller is configured to exit the second low-power mode and entire into a powered-up mode based on receiving the wake-up command.

Aspect 7: The vehicle system of any of Aspects 1-6, wherein the processing circuit is configured to generate an instantaneous measurement of the measured property from the sensor signal, generate an ambient measurement of the measured property from the sensor signal, and compute the derivative measurement based on the instantaneous measurement and the ambient measurement.

Aspect 8: The vehicle system of any of Aspects 1-7, wherein the sensor controller is configured to power down at least one component of the processing circuit between sampling times of the plurality of sampling times and power up the at least one component of the processing circuit at each sampling time of the plurality of sampling times to compute the derivative measurement.

Aspect 9: The vehicle system of Aspect 8, wherein the sensor controller includes a timer configured to trigger, during the low-power mode, each sampling time of the plurality of sampling times at a regular interval.

Aspect 10: The vehicle system of any of Aspects 1-9, wherein the processing circuit is configured to compute each instance of the derivative measurement at a different sampling time of the plurality of sampling times.

Aspect 11: The vehicle system of any of Aspects 1-10, wherein the plurality of sampling times are configured to occur at regular intervals.

Aspect 12: The vehicle system of any of Aspects 1-11, wherein the derivative measurement satisfies the threshold on a condition that the derivative measurement is greater than the threshold.

Aspect 13: The vehicle system of any of Aspects 1-12, wherein the collision monitoring system is an air bag monitoring system and the wake-up command indicates that a collision event has been detected by the air bag monitoring system.

Aspect 14: The vehicle system of any of Aspects 1-13, wherein the sensor controller is configured to transmit the wake-up command by toggling a current on the current-modulation communication interface.

Aspect 15: The vehicle system of any of Aspects 1-14, further comprising: a battery; and a motor connected to the battery, wherein the vehicle controller is configured to disconnect the battery from the motor based on receiving the wake-up command.

Aspect 16: An air bag system of a vehicle, comprising: a collision monitoring system coupled to a current-modulation communication interface, wherein the collision monitoring system comprises: a sensor controller configured to receive a parking mode command via the current-modulation communication interface and enter into a low-power mode based on receiving the parking mode command, wherein the parking mode command is indicative of the vehicle being in a parked state, and wherein the sensor controller is configured to set the current-modulation communication interface into an idle communication mode during the low-power mode; an air bag sensor configured to generate a sensor signal during the low-power mode based on a measured property; and a processing circuit configured to compute, during the low-power mode, a derivative measurement at a plurality of sampling times based on the sensor signal, and compare each instance of the derivative measurement to a threshold, wherein the sensor controller is configured to exit the low-power mode and transmit an alarm signal via the current-modulation communication interface based on the derivative measurement satisfying the threshold at one of the plurality of sampling times.

Aspect 17: The air bag system of Aspect 16, wherein the current-modulation communication interface is a two-wire peripheral sensor interface.

Aspect 18: The air bag system of any of Aspects 16-17, wherein the sensor controller is configured to power down at least one component of the processing circuit between sampling times of the plurality of sampling times and power up the at least one component of the processing circuit at each sampling time of the plurality of sampling times to compute the derivative measurement.

Aspect 19: The air bag system of Aspect 18, wherein the sensor controller includes a timer configured to trigger, during the low-power mode, each sampling time of the plurality of sampling times at a regular interval.

Aspect 20: The air bag system of any of Aspects 16-19, wherein the processing circuit is configured to compute each instance of the derivative measurement at a different sampling time of the plurality of sampling times.

Aspect 21: The air bag system of any of Aspects 16-20, wherein the sensor controller is configured to transmit the alarm signal by toggling a current on the current-modulation communication interface.

Aspect 22: A method, comprising: detecting, by a vehicle controller, a parking mode of a vehicle; generating, by the vehicle controller, a low-power command based on detecting the parking mode; receiving, by a sensor controller, the low-power command via a current-modulation communication interface; and entering, by the sensor controller, into a low-power mode based on receiving the low-power command, including setting the current-modulation communication interface into an idle communication mode during the low-power mode; wherein, during the low-power mode, the method further comprises: generating, by a sensor, a sensor signal based on a measured property; computing, by a processing circuit, a derivative measurement at a plurality of sampling times based on the sensor signal; comparing, by the processing circuit, each instance of the derivative measurement to a threshold; and transmitting, by the sensor controller, a wake-up command to the vehicle controller via the current-modulation communication interface based on the derivative measurement satisfying the threshold.

Aspect 23: A system configured to perform one or more operations recited in one or more of Aspects 1-22.

Aspect 24: An apparatus comprising means for performing one or more operations recited in one or more of Aspects 1-22.

Aspect 25: A non-transitory computer-readable medium storing a set of instructions, the set of instructions comprising one or more instructions that, when executed by a device, cause the device to perform one or more operations recited in one or more of Aspects 1-22.

Aspect 26: A computer program product comprising instructions or code for executing one or more operations recited in one or more of Aspects 1-22.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A vehicle system, comprising:
   a vehicle controller configured to detect a parking mode of a vehicle and generate a low-power command based on detecting the parking mode;
   a collision monitoring system; and
   a current-modulation communication interface coupled to the vehicle controller and the collision monitoring system,
   wherein the collision monitoring system comprises:
      a sensor controller configured to receive the low-power command via the current-modulation communication interface and enter into a low-power mode based on receiving the low-power command, wherein the sensor controller is configured to set the current-modulation communication interface into an idle communication mode during the low-power mode;
      a sensor configured to generate a sensor signal based on a measured property; and
      a processing circuit configured to compute, during the low-power mode, a derivative measurement at a plurality of sampling times based on the sensor signal such that multiple instances of the derivative measurement are computed,
      wherein the processing circuit is configured to compare each instance of the multiple instances of the derivative measurement to a threshold, and
      wherein the sensor controller is configured to transmit a wake-up command to the vehicle controller via the current-modulation communication interface based on an instance of the multiple instances of the derivative measurement satisfying the threshold.

2. The vehicle system of claim 1, wherein the sensor controller is configured to release the current-modulation communication interface from the idle communication mode based on the derivative measurement satisfying the threshold.

3. The vehicle system of claim 1, wherein, in the low-power mode, the sensor controller is configured to set a current of the current-modulation communication interface to a low current based on receiving the low-power command, wherein the low current is less than a transmission current.

4. The vehicle system of claim 1, wherein the current-modulation communication interface is a two-wire peripheral sensor interface.

5. The vehicle system of claim 1, wherein the sensor is a pressure sensor or an acceleration sensor.

6. The vehicle system of claim 1, wherein the low-power mode is a first low-power mode,
wherein, the vehicle controller is configured to enter into a second low-power mode based on detecting the parking mode, and
wherein the vehicle controller is configured to exit the second low-power mode and enter into a powered-up mode based on receiving the wake-up command.

7. The vehicle system of claim 1, wherein the processing circuit is configured to generate an instantaneous measurement of the measured property from the sensor signal, generate an ambient measurement of the measured property from the sensor signal, and compute the derivative measurement based on the instantaneous measurement and the ambient measurement.

8. The vehicle system of claim 1, wherein the sensor controller is configured to power down at least one component of the processing circuit between sampling times of the plurality of sampling times and power up the at least one component of the processing circuit at each sampling time of the plurality of sampling times to compute the derivative measurement.

9. The vehicle system of claim 8, wherein the sensor controller includes a timer configured to trigger, during the low-power mode, each sampling time of the plurality of sampling times at a regular interval.

10. The vehicle system of claim 1, wherein the processing circuit is configured to compute each instance of the derivative measurement at a different sampling time of the plurality of sampling times such that each instance of the derivative measurement corresponds to a different sampling time of the plurality of sampling times.

11. The vehicle system of claim 1, wherein the plurality of sampling times are configured to occur at regular intervals.

12. The vehicle system of claim 1, wherein the derivative measurement satisfies the threshold on a condition that the derivative measurement is greater than the threshold.

13. The vehicle system of claim 1, wherein the collision monitoring system is an air bag monitoring system and the wake-up command indicates that a collision event has been detected by the air bag monitoring system.

14. The vehicle system of claim 1, wherein the sensor controller is configured to transmit the wake-up command by toggling a current on the current-modulation communication interface.

15. The vehicle system of claim 1, further comprising:
a battery; and
a motor connected to the battery,
wherein the vehicle controller is configured to disconnect the battery from the motor based on receiving the wake-up command.

16. An air bag system of a vehicle, comprising:
a collision monitoring system coupled to a current-modulation communication interface,
wherein the collision monitoring system comprises:
a sensor controller configured to receive a parking mode command via the current-modulation communication interface and enter into a low-power mode based on receiving the parking mode command, wherein the parking mode command is indicative of the vehicle being in a parked state, and wherein the sensor controller is configured to set the current-modulation communication interface into an idle communication mode during the low-power mode;
an air bag sensor configured to generate a sensor signal during the low-power mode based on a measured property; and
a processing circuit configured to compute, during the low-power mode, a derivative measurement at a plurality of sampling times based on the sensor signal, and compare each instance of the derivative measurement to a threshold,
wherein the sensor controller is configured to exit the low-power mode and transmit an alarm signal via the current-modulation communication interface based on the derivative measurement satisfying the threshold at one of the plurality of sampling times.

17. The air bag system of claim 16, wherein the current-modulation communication interface is a two-wire peripheral sensor interface.

18. The air bag system of claim 16, wherein the sensor controller is configured to power down at least one component of the processing circuit between sampling times of the plurality of sampling times and power up the at least one component of the processing circuit at each sampling time of the plurality of sampling times to compute the derivative measurement.

19. The air bag system of claim 18, wherein the sensor controller includes a timer configured to trigger, during the low-power mode, each sampling time of the plurality of sampling times at a regular interval.

20. The air bag system of claim 16, wherein the processing circuit is configured to compute each instance of the derivative measurement at a different sampling time of the plurality of sampling times.

21. The air bag system of claim 16, wherein the sensor controller is configured to transmit the alarm signal by toggling a current on the current-modulation communication interface.

22. A method, comprising:
detecting, by a vehicle controller, a parking mode of a vehicle;
generating, by the vehicle controller, a low-power command based on detecting the parking mode;
receiving, by a sensor controller, the low-power command via a current-modulation communication interface; and
entering, by the sensor controller, into a low-power mode based on receiving the low-power command, including setting the current-modulation communication interface into an idle communication mode during the low-power mode;
wherein, during the low-power mode, the method further comprises:
generating, by a sensor, a sensor signal based on a measured property;
computing, by a processing circuit, a derivative measurement at a plurality of sampling times based on the sensor signal;
comparing, by the processing circuit, each instance of the derivative measurement to a threshold; and
transmitting, by the sensor controller, a wake-up command to the vehicle controller via the current-modulation communication interface based on the derivative measurement satisfying the threshold.

23. The vehicle system of claim 1, wherein the vehicle controller is an electronic control unit (ECU).

24. The vehicle system of claim 7, wherein the processing circuit is configured to calculate each instance of the derivative measurement based on calculating a difference between the instantaneous measurement and the ambient measurement, and dividing the difference by the ambient measurement to obtain the derivative measurement.

\* \* \* \* \*